US012804744B2

(12) United States Patent
Hong

(10) Patent No.: US 12,804,744 B2
(45) Date of Patent: Nov. 17, 2026

(54) DATA FRAME TRANSMISSION METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 354 days.

(21) Appl. No.: 17/791,827

(22) PCT Filed: Jan. 10, 2020

(86) PCT No.: PCT/CN2020/071492

§ 371 (c)(1),
(2) Date: Jul. 8, 2022

(87) PCT Pub. No.: WO2021/138909

PCT Pub. Date: Jul. 15, 2021

(65) Prior Publication Data

US 2023/0108402 A1 Apr. 6, 2023

(51) Int. Cl.

*H04W 76/15* (2018.01)
*H04L 47/27* (2022.01)
*H04L 47/34* (2022.01)
*H04L 47/41* (2022.01)

(52) U.S. Cl.

CPC ............ *H04W 76/15* (2018.02); *H04L 47/27* (2013.01); *H04L 47/34* (2013.01); *H04L 47/41* (2013.01)

(58) Field of Classification Search

CPC ......... H04L 47/27; H04L 47/34; H04L 47/41; H04L 1/1642; H04W 76/15; H04W 84/12; H04W 72/12

See application file for complete search history.

(56) References Cited

U.S. PATENT DOCUMENTS

2011/0170491 A1* 7/2011 Shinohara ............... H04L 47/34 370/328
2011/0182171 A1* 7/2011 McNew ............ H04W 74/0816 370/216
2012/0014335 A1* 1/2012 Adachi ................. H04W 48/08 370/329

(Continued)

FOREIGN PATENT DOCUMENTS

CN 102244568 A * 11/2011
CN 108141276 A 6/2018

(Continued)

OTHER PUBLICATIONS

INOA for issued in Application No. 202247045100, dated Nov. 24, 2022, with English translation,(8p).

(Continued)

*Primary Examiner* — Atique Ahmed

(74) *Attorney, Agent, or Firm* — Arch & Lake LLP; Han Tan; Shen Wang

(57) ABSTRACT

A data frame transmission method includes: determining that transmission of a data frame is switched from a first link to a second link; and in response to determining that the transmission of the data frame is switched from the first link to the second link, carrying out retransmission counting of the data frame on the second link.

9 Claims, 3 Drawing Sheets

(56) References Cited

U.S. PATENT DOCUMENTS

| | | | | |
|---|---|---|---|---|
| 2012/0213104 | A1* | 8/2012 | Chang | H04W 52/286 370/252 |
| 2013/0159806 | A1* | 6/2013 | Okuno | H04L 1/1858 714/749 |
| 2013/0301417 | A1* | 11/2013 | Terry | H04L 1/1809 370/236 |
| 2014/0254351 | A1* | 9/2014 | Newman | H04L 1/1877 370/228 |
| 2016/0016596 | A1* | 1/2016 | Naylor | B61L 15/0027 709/220 |
| 2017/0070992 | A1* | 3/2017 | Matsuo | H04W 72/0446 |
| 2017/0099120 | A1* | 4/2017 | Damnjanovic | H04L 1/1822 |
| 2017/0325266 | A1* | 11/2017 | Kim | H04W 84/12 |
| 2018/0205502 | A1 | 7/2018 | Merlin et al. | |
| 2018/0254993 | A1* | 9/2018 | Ahn | H04L 1/1607 |
| 2019/0182870 | A1* | 6/2019 | Shih | H04W 74/0833 |
| 2019/0274103 | A1* | 9/2019 | Gan | H04W 74/08 |
| 2021/0218686 | A1* | 7/2021 | Galeev | H04L 43/022 |
| 2021/0235322 | A1* | 7/2021 | Jauh | H04L 41/0803 |
| 2022/0098918 | A1* | 3/2022 | Wu | E05F 15/77 |

FOREIGN PATENT DOCUMENTS

| | | | |
|---|---|---|---|
| WO | 2017034081 | A1 | 3/2017 |
| WO | 2019080070 | A1 | 5/2019 |

OTHER PUBLICATIONS

International Search Report of PCT/CN2020/071492 dated Sep. 27, 2020 with English translation, (4p).

Khorov, Evgeny et al., Enabling the Internet of Things With Wi-Fi Halow-Performance Evaluation of the Restricted Access Window, IEEE Access, vol. 7, Sep. 6, 2019, (14p).

Intel Corporation, "Remaining Details on HARQ Feedback Based CW Adaptation", 3GPP TSG RAN WG1 Meeting #83, R1-156511, Nov. 22, 2015, (5p).

Intel Corporation, "WF on remaining issues for beam failure recovery", 3GPP TSG RAN WG1, Meeting #92bis, R1-1805565, Sanya, China, Apr. 20, 2018, (7p).

* cited by examiner

DATA FRAME TRANSMISSION METHOD AND DEVICE

CROSS-REFERENCE TO RELATED APPLICATION

This application is the US national phase application of International Application No. PCT/CN2020/071492, filed on Jan. 10, 2020, the entire contents of which are incorporated herein by reference for all purposes.

TECHNICAL FIELD

The present disclosure relates to the field of communication technologies, and in particular, to a method and an apparatus for data frame transmission, and a storage medium.

BACKGROUND

In order to improve the access rate and throughput of Wireless Local Area Network (WLAN) technologies such as Wireless Fidelity (Wi-Fi), IEEE802.11 established the SG (study group) IEEE802.11be to study the next-generation mainstream Wi-Fi technology.

In the next-generation mainstream Wi-Fi technology, in order to improve the throughput of the overall system and improve the success rate of data transmission/reception, data frames can be transmitted under multiple links. Under multiple links, the transmission of the data frame may be switched from one link to another.

However, in the related art, no corresponding implementation is given for how to count the number of times of data frame retransmission in the case of switching links for data frame transmission.

SUMMARY

According to a first aspect of the present disclosure, a method for data frame transmission is provided. The method includes:

- determining that transmission of a data frame is switched from a first link to a second link; and in response to determining that the transmission of the data frame is switched from the first link to the second link, performing retransmission counting of the data frame on the second link.

According to a second aspect of the present disclosure, an apparatus for data frame transmission is provided, including:

- a processor; and a memory, configured to store instructions executable by the processor.

Furthermore, the processor is configured to implement the method for data frame transmission described in the first aspect or any implementation of the first aspect.

According to a third aspect of the present disclosure, a non-transitory computer readable storage medium is provided. When instructions in the storage medium are executed by a processor, the processor is enabled to implement the method for data frame transmission described in the first aspect or any implementation of the first aspect.

It is to be understood that the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure, and together with the description, serve to explain the principles of the present disclosure and do not unduly limit the present disclosure.

DETAILED DESCRIPTION

Figure 1:
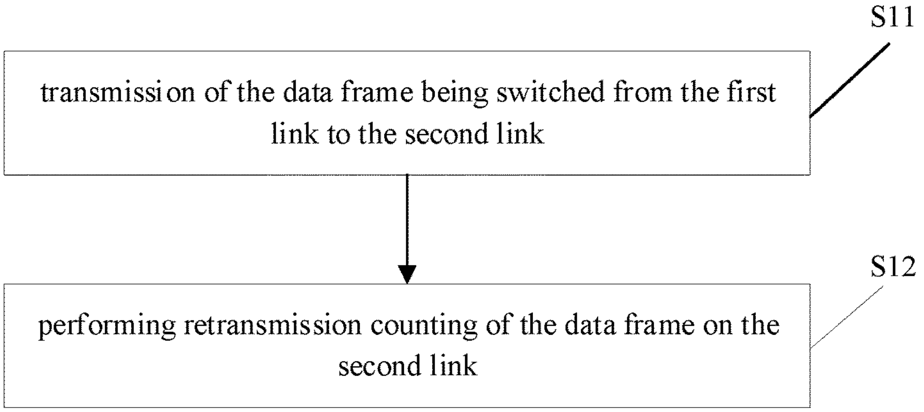
FIG. 1 is a flowchart of a method for data frame transmission according to an embodiment.

Embodiments will be described in detail herein, examples of which are illustrated in the accompanying drawings. Where the following description refers to the drawings, the same numerals in different drawings refer to the same or similar elements unless otherwise indicated. The implementations described in the embodiments below are not intended to represent all implementations consistent with this disclosure. Rather, they are merely examples of apparatus and methods consistent with some aspects of the present disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The method for data frame transmission provided by embodiments of the present disclosure is applied to a wireless local area network communication system including a data sending device and a data receiving device. The data sending device and the data receiving device may be a station (STA) or an access point (AP). The forward transmission and backhaul of data are performed between the data sending device and the data receiving device through the wireless local area network.

The STA involved in the present disclosure may be understood as a user terminal in the wireless local area network, and the user terminal may be referred to as user equipment (UE), mobile station (MS), mobile terminal (MT), etc., which is a device that provides voice and/or data connectivity to a user. For example, the terminal may be a handheld device with a wireless connection function, a vehicle-mounted device, and the like. At present, some examples of terminals are: Smart Phone (Mobile Phone), Pocket Personal Computer (PPC), Handheld Computer, Personal Digital Assistant (PDA), Notebook Computer, Tablet Computer, Wearable Device, Internet of Things (IoT) client or in-vehicle device, etc.

The AP involved in the present disclosure refers to a device, a router, and the like that the user terminal in the wireless local area network accesses the network.

In the related art, the IEEE802.11 standard is used for data frame transmission between the STA and the AP. At present, IEEE802.11 has established the SG (study group) IEEE802.11be to study the next-generation mainstream Wi-Fi technology. The research scope is: 320 MHz bandwidth transmission, aggregation and coordination of multiple frequency bands, etc. The proposed vision is: compared with the existing IEEE802.11ax, the speed and throughput are increased by at least four times. Its main application scenarios are video transmission, AR, VR, etc.

The aggregation and coordination of multiple frequency bands refers to simultaneous communication in multiple frequency bands or multiple bandwidths in the same frequency band, for example, simultaneous communication in three frequency bands of 2.4 GHz, 5 GHz, and 6-7 GHz. Simultaneous communication in multiple frequency bands or multiple bandwidths in the same frequency can be understood as multi-link communication, or called multi-link aggregation (MLA).

Data frames are transmitted under multiple links. Data frames with the same Quality of Service (QoS) requirement are assigned the same Traffic Identify (TID), or data frames having the same content and assigned the same Sequence Number (SN) are also assigned the same TID. When the data frame is retransmitted, the data frame retransmission counting is performed. For example, a STA short retry count (SSRC) and a STA long retry count (SLRC) are performed.

In embodiments of the present disclosure, when a data frame is transmitted under multiple links, a clock for data frame transmission is set, and for different links, data frame retransmission counts (counts of SSRC and/or SLRC) are independent of each other. For a newly transmitted data frame, an initial value of the data frame retransmission count (the count of SSRC and/or SLRC) under each link is set to 0. When retransmission occurs, the retransmission count value increases one by one, and the contention window (CW) also increases accordingly. The retransmission count value increases until the CW window reaches the maximum value and does not increase and remains unchanged. It can be understood that if the CW window is at the maximum value, but the clock used for data frame transmission does not reach the maximum value, the data frame retransmission count (the count of SSRC and/or SLRC) does not increase and remains unchanged.

During the transmission of the data frame, if the transmission of the data frame is switched from one link to another link, how to count the retransmission of the data frame needs to be further studied.

Embodiment of the present disclosure provides a method for data frame transmission. When transmission of the data frame is switched from a first link to a second link, the retransmission counting of the data frame is performed on the second link, so as to realize counting of data frame retransmission when switching of data frame transmission occurs.

FIG. 1 is a flowchart of a method for data frame transmission according to an embodiment. As shown in FIG. 1, the method for data frame transmission is applied in a station or an AP, and includes the following steps.

In step S11, it is determined that transmission of a data frame is switched from a first link to a second link.

In embodiments of the present disclosure, the data frame is transmitted under multiple links, and can be switched between links. For convenience of description, the link where the data frame is before switching is called the first link, and the link where the data frame is after switching is called the second link.

In step S12, in response to the transmission of the data frame being switched from the first link to the second link, retransmission counting of the data frame is performed on the second link.

In this embodiment of the present disclosure, the retransmission counting of the data frame on the second link may be performed in the following manner 1 or manner 2.

Manner 1: On the second link, a retransmission count value of the data frame is set to zero, and then the retransmission counting is performed, and TID and/or SN are reassigned to the data frame.

In an implementation, in an embodiment of the present disclosure, the retransmission count value of the data frame corresponding to the second link is set to zero, and the TID and/or SN are reassigned to the data frame, so that the retransmission counting of the data frame is accordingly performed on the second link.

In an embodiment of the present disclosure, on the second link, the retransmission counting is performed after the retransmission count value of the data frame is set to zero, which can be understood as the retransmission counting performed on the data frame as a newly transmitted data frame on the second link. For example, the SSRC and/or SLRC are initialized, and the count value of the SSRC and/or SLRC is set to zero, so as to perform the retransmission counting of the data frame on the second link.

In an embodiment of the present disclosure, when retransmission of the data frame is recounted on the second link, the retransmission count value of the data frame is set to zero and then the retransmission counting is performed, and the TID and/or SN are reassigned to the data frame.

Further, in an embodiment of the present disclosure, when the retransmission of the data frame is recounted on the second link, the retransmission counting of the data frame on the first link may be terminated.

In an embodiment of the present disclosure, assigning TID and/or SN to the data frame refers to:

assigning TID and SN to the data frame; or assigning TID to the data frame without limiting the manner of determining the SN of the data frame; or assigning SN to the data frame without limiting the manner of determining the TID of the data frame.

In embodiments of the present disclosure, TID and/or SN may be reassigned to the data frame. That is: when the reassignment reassigns TID and/or SN for the data frame, the TID and SN are reassigned for the data frame transmitted on the second link; or, when the reassignment reassigns TID and/or SN for the data frame, TID is reassigned for the data frame transmitted on the second link, and the manner of determining the SN of the second link is not limited; or, when the reassignment reassigns the TID and/or SN for the data frame, the SN is reassigned for the data frame transmitted on the second link, and the manner for determining the TID of the second link is not limited.

Of course, the above-mentioned embodiments are all examples to illustrate the technical solutions of the embodiments of the present disclosure, and do not limit the protection scope of the embodiments of the present disclosure.

In an embodiment of the present disclosure, when the clock used for data frame transmission fails, or when the clock used for data frame transmission fails and the CW window is at the maximum value, re-counting of data frame retransmission is performed on the second link. It can be understood that, when the retransmission counting of the data frame is performed on the second link in the first manner, it can be performed in response to determining that the clock used for data frame transmission is invalid or determining that the clock used for data frame transmission is invalid and the CW window is at the maximum value.

Figure 2:
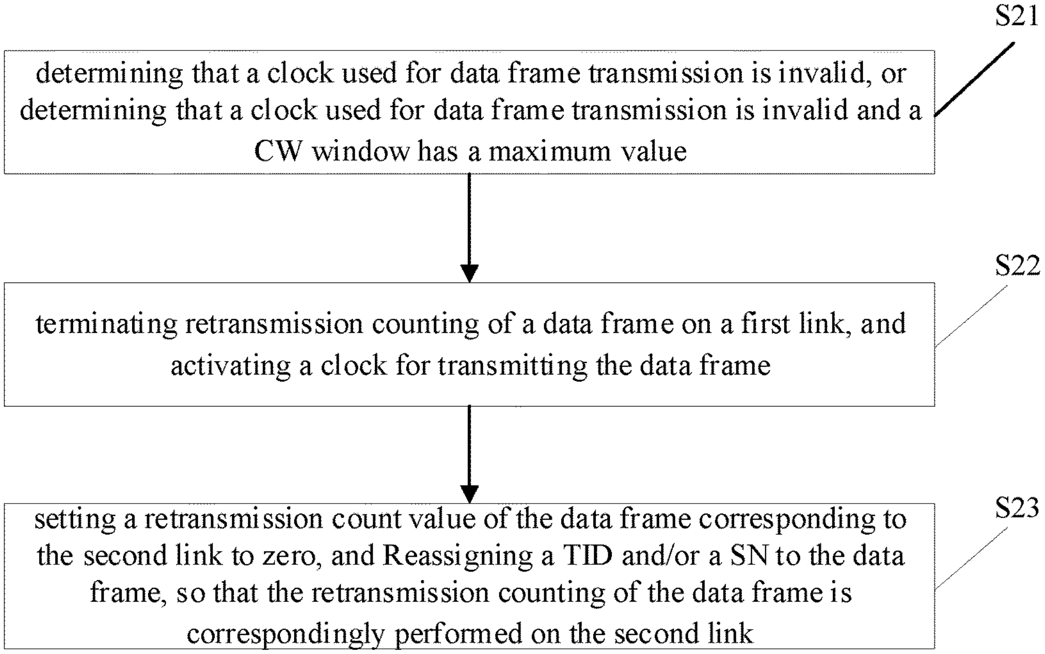
FIG. 2 is a flowchart of a method for data frame transmission according to an embodiment.

FIG. 2 is a flowchart of a method for data frame transmission according to an embodiment. As shown in FIG. 2, the method for data frame transmission is applied in a station or an AP, and includes the following steps.

In step S21, it is determined that a clock used for data frame transmission is invalid, or it is determined that a clock used for data frame transmission is invalid and a CW window has a maximum value.

In step S22, retransmission counting of a data frame on a first link is terminated, and a clock for transmitting the data frame is activated.

In step S23, a retransmission count value of the data frame corresponding to the second link is set to zero, and a TID and/or a SN are reassigned to the data frame, so that the retransmission counting of the data frame is correspondingly performed on the second link.

In an embodiment of the present disclosure, when the transmission of the data frame is switched from the first link to the second link, the retransmission counting of the data frame is re-counted on the second link, so as to realize counting of the data frame retransmission when switching of the data frame transmission occurs. In addition, in the case that the clock of the first link fails, the retransmission of the data frame is counted.

Manner 2: On the second link, the retransmission counting is performed by taking the retransmission count value of the data frame on the first link as the initial value, perform, and the TID and/or SN assigned in the first link continues to be used.

In embodiments of the present disclosure, in an implementation, when the retransmission count value of the data frame on the first link continues to be used for the retransmission counting on the second link, the retransmission count value of the data frame corresponding to the first link may be used as the initial value of the retransmission count value of the data frame corresponding to the second link, so that the retransmission counting of the data frame is performed on the second link. Further, in the second manner in embodiments of the present disclosure, the TID and/or SN of the data frame corresponding to the first link is continued to be used as the corresponding TID and/or SN of the second link.

In an embodiment of the present disclosure, when the clock used for data frame transmission is valid, or when the CW window for the retransmission counting of the data frame on the first link has the maximum value, the second may be adopted to continue to use the retransmission count value on the first link for the retransmission counting of the data frame. For example, if the transmission of the data frame is switched, when it is determined that the clock used for the transmission of the data frame is valid, or when it is determined that the CW window for retransmission counting of the data frame on the first link has the maximum value, on the second link, the retransmission count value of the data frame corresponding to the first link is used as the initial value of the retransmission count value of the data frame corresponding to the second link, so that the retransmission counting of the data frame is performed on the second link, and the assigned TID and/or SN in the first link continues to be used.

In an embodiment of the present disclosure, assigning TID and/or SN to the data frame refers to:

assigning TID and SN to the data frame; or assigning TID to the data frame without limiting the manner of determining the SN of the data frame; or assigning SN to the data frame without limiting the manner of determining the TID of the data frame.

In embodiments of the present disclosure, TID and/or SN may be reassigned to the data frame. That is: When the TID and SN of the data frame corresponding to the first link continues to be used, the TID and SN of the first link continue to be used as the TID and SN of the second link. Or, when the TID of the data frame corresponding to the first link continues to be used, the TID of the first link is used as the initial value of the TID of the second link, and the method of determining the SN of the second link is not limited. Or, when the SN of the data frame corresponding to the first link continues to be used, the SN of the first link is used as the initial value of the SN of the second link, and the method of determining the TID of the second link is not limited.

Of course, the above-mentioned embodiments are all examples to illustrate the technical solutions of the embodiments of the present disclosure, and do not limit the protection scope of the embodiments of the present disclosure.

In an embodiment of the present disclosure, the TID assigned in the first link is used as the identifier of the retransmitted data frame. For further identification, the SN number (single data frame and continuous data frames) can also be carried. If it is continuous data frames, the identifier assigned to the continuous data frames can be carried, for example, the identifier assigned to the continuous data frames can be carried at the position in the SN.

Figure 3:
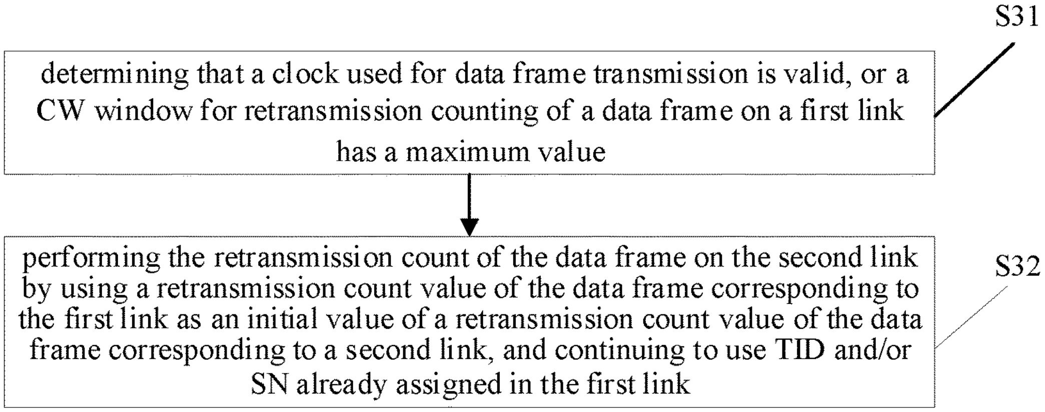
FIG. 3 is a flowchart of a method for data frame transmission according to an embodiment.

FIG. 3 is a flowchart of a method for data frame transmission according to an embodiment. As shown in FIG. 3, the method for data frame transmission is applied in a station or an AP, and includes the following steps.

In step S31, it is determined that a clock used for data frame transmission is valid, or a CW window for retransmission counting of a data frame on a first link has a maximum value.

In step S32, the retransmission count of the data frame is performed on the second link by using a retransmission count value of the data frame corresponding to the first link as an initial value of a retransmission count value of the data frame corresponding to a second link, and TID and/or SN already assigned in the first link continues to be used.

In an embodiment of the present disclosure, when the transmission of the data frame is switched from the first link to the second link, the retransmission count value of the data frame corresponding to the first link is continued to be used on the second link to count the retransmission of the data frame, which can realize counting of data frame retransmission when switching occurs for data frame transmission.

It can be understood that, in the above-mentioned embodiments of the present disclosure, when the transmission of the data frame under the multi-link is switched from the first link to the second link, and the retransmission counting of the data frame is performed on the second link, if the CW window reaches the maximum value, but the clock for transmitting the data frame continues to be valid and does not reach the maximum value, the CW window can be initialized on the second link, and when the data frame is retransmitted, the retransmission count value is increased one by one until the CW window reaches the maximum value.

It can be further understood that the retransmission counting process involved in the embodiments of the present disclosure may be a retransmission counting process for SSRC and/or SLRC, and the retransmission count value may be a SSRC count value or a SLRC count value. It can be understood that, under multiple links, if the data frame is retransmitted, the SSRC count value and/or the SLRC count value increase one by one.

It can be further understood that, in embodiments of the present disclosure, if the clock used for transmitting the data frame fails, when the transmission of the data frame is switched, manner 1 is adopted to initialize the SSRC count value and/or the SLRC count value, and initialize the CW window, and reactivate the clock used to transmit the data frame, so as to count data frame retransmissions on the second link. If the clock used to transmit the data frame is valid, manner 2 is adopted to initialize the CW window, and use the SRC count value and/or SLRC count value of the data frame corresponding to the first link as the initial value of the retransmission count value of the data frame corresponding to the second link, and continue to use the clock used to transmit the data frame, so as to count the retransmission of the data frame on the second link.

It can be further understood that, in embodiments of the present disclosure, assigning TID and/or SN to the data frame refers to:

assigning TID and SN to the data frame; or assigning TID to the data frame without limiting the manner of determining the SN of the data frame; or assigning SN to the data frame without limiting the manner of determining the TID of the data frame.

In all embodiments of the present disclosure, the TID and/or SN of the data frame corresponding to the first link may continue to be used as the corresponding TID and/or SN of the second link. That is, when the TID and SN of the data frame corresponding to the first link continues to be used, the TID and SN of the first link continue to be used as the TID and SN of the second link. Or, when the TID of the data frame corresponding to the first link continues to be used, the TID of the first link is used as the initial value of the TID of the second link, and the method of determining the SN of the second link is not limited. Or, when the SN of the data frame corresponding to the first link continues to be used, the SN of the first link is used as the initial value of the SN of the second link, and the method of determining the TID of the second link is not limited.

In all embodiments of the present disclosure, TID and/or SN may be reassigned to the data frame. That is: when the reassignment reassigns TID and/or SN for the data frame, the TID and SN are reassigned for the data frame transmitted on the second link; or, when the reassignment reassigns TID and/or SN for the data frame, TID is reassigned for the data frame transmitted on the second link, and the manner of determining the SN of the second link is not limited; or, when the reassignment reassigns the TID and/or SN for the data frame, the SN is reassigned for the data frame transmitted on the second link, and the manner for determining the TID of the second link is not limited.

Of course, the above-mentioned embodiments are all examples to illustrate the technical solutions of the embodiments of the present disclosure, and do not limit the protection scope of the embodiments of the present disclosure.

In an implementation provided by the embodiments of the present disclosure, if the data frame transmission is successful, the retransmission count value is initialized to zero. In embodiments of the present disclosure, if the data frame transmission is successful, the clock of the data frame transmission may be reset to zero.

Based on the same concept, embodiments of the present disclosure also provide an apparatus for data frame transmission.

It can be understood that, in order to implement the above-mentioned functions, the apparatus for data frame transmission provided by embodiments of the present disclosure includes corresponding hardware structures and/or software modules for executing respective functions. Combining with the units and algorithm steps of each example disclosed in the embodiments of the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 4:
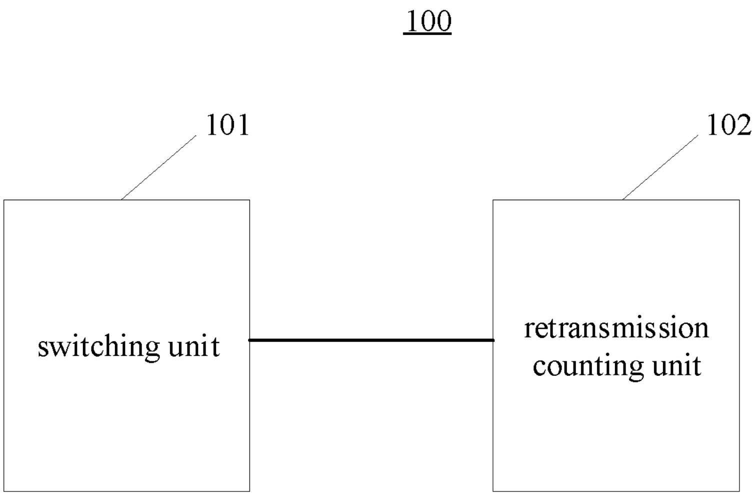
FIG. 4 is a block diagram of an apparatus for data frame transmission according to an embodiment.

FIG. 4 is a block diagram of an apparatus for data frame transmission according to an embodiment. Referring to FIG. 4, the apparatus 100 for data frame transmission includes a switching unit 101 and a retransmission counting unit 102.

The switching unit 101 is configured to determine that transmission of a data frame is switched from a first link to a second link. The retransmission counting unit 102 is configured to, in response to the transmission of the data frame being switched from the first link to the second link, perform retransmission counting of the data frame on the second link.

In an implementation, the retransmission counting unit 102 is configured to perform the retransmission counting of the data frame on the second link by setting a retransmission count value of the data frame corresponding to the second link to zero and reassigning a transmission identifier and/or a sequence number for the data frame.

In another implementation, the retransmission counting unit 102 is further configured to:

terminate retransmission counting of the data frame on the first link.

In another implementation, the retransmission counting unit 102 is further configured to:

determine that a clock for transmitting the data frame is invalid; or determine that the clock for transmitting the data frame is invalid and a contention window for retransmitting the data frame on the first link has a maximum value; activating the clock for transmitting the data frame.

In yet another implementation, the retransmission counting unit 102 is configured to:

perform the retransmission counting of the data frame on the second link by taking a retransmission count value of the data frame corresponding to the first link as an initial value of a retransmission count value of the data frame corresponding to the second link; continue to use a transmission identifier and/or a sequence number of the data frame corresponding to the first link as a transmission identifier and/or a sequence number of the data frame corresponding to the second link.

In another implementation, the retransmission counting unit 102 is further configured to:

determine that a clock for performing the retransmission counting of the data frame is valid; or determine that a contention window for performing the retransmission counting of the data frame on the first link has a maximum value.

In another implementation, the retransmission counting unit 102 performs the retransmission counting by:

initializing a contention window, and increasing a retransmission count value in response to retransmission of the data frame until the contention window reaches a maximum value.

In another implementation, the retransmission counting unit 102 is further configured to:

in response to the successful transmission of the data frame, initialize the retransmission count value to zero.

Regarding the apparatus in the above embodiments, the specific manner in which each module performs the operation has been described in detail in the embodiments of the method, and will not be described in detail here.

Figure 5:
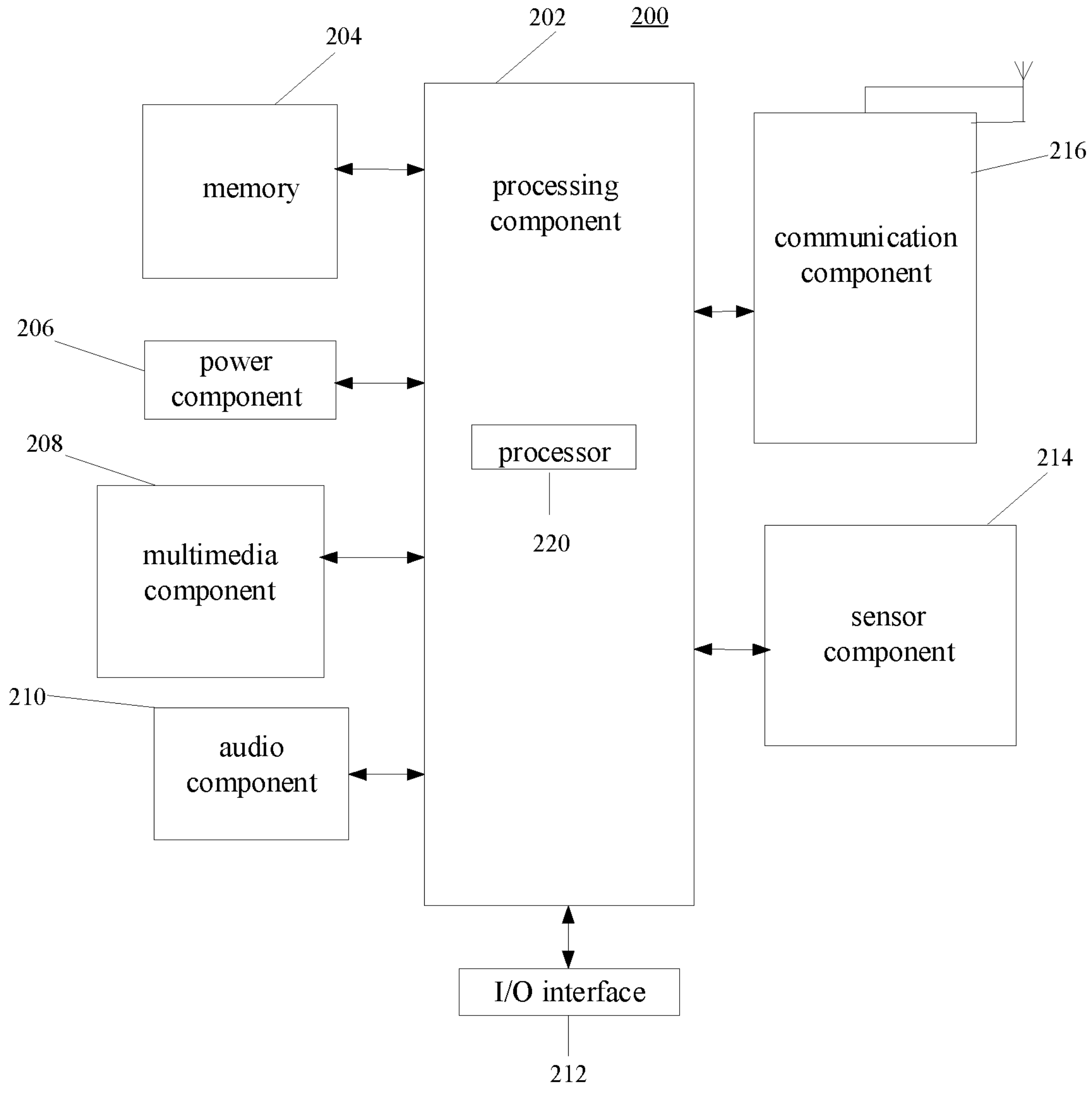
FIG. 5 is a block diagram of an apparatus for data frame transmission according to an embodiment.

FIG. 5 is a block diagram illustrating an apparatus 200 for data frame transmission according to an example embodiment. The apparatus 200 may be a mobile phone, a computer, a digital broadcasting terminal, a messaging transceiver, a game console, a tablet device, a medical equipment, a fitness equipment, a personal digital assistant, etc.

Referring to FIG. 5, the apparatus 200 may include one or more of the following components: a processing component 202, a memory 204, a power component 206, a multimedia component 208, an audio component 210, an input/output (I/O) interface 212, a sensor component 214 and a communication component 216.

The processing component 202 typically controls overall operations of the apparatus 200, such as the operations associated with display, data communications, telephone call, camera operations, and recording operations. The processing component 202 may include one or more processors 220 to execute instructions so as to perform all or part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, videos, etc. The memory 204 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 may include a power management system, one or more power sources, and any other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 208 includes a front camera and/or a rear camera. The front camera and/or the rear camera may receive an external multimedia datum while the apparatus 200 is in an operation mode, such as a photographing mode or a video mode. Each of the front camera and the rear camera may be a fixed optical lens system or have focus and optical zoom capability.

The audio component 210 is configured to output and/or input an audio signal. For example, the audio component 210 includes a microphone ("MIC") configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the apparatus 200. For instance, the sensor component 214 may detect an opened/closed status of the apparatus 200, relative positioning of components (e.g., the display and the keypad) of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate wired or wireless communication between the apparatus 200 and other apparatus. The apparatus 200 can access a wireless network based on a communication standard, such as Wi-Fi, 2G, or 3G, or a combination thereof. In one embodiment, the communication component 216 receives a broadcast signal or broadcast associated information from an external broadcast management system via a broadcast channel. In one embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an embodiment, there is also provided a non-transitory computer-readable storage medium including instructions, such as a memory 204 including instructions, executable by the processor 220 of the apparatus 200 to perform the method described above. For example, the non-transitory computer-readable storage medium may be ROM, random access memory (RAM), CD-ROM, magnetic tape, floppy disk, optical data storage device, and the like.

The technical solutions provided by the present disclosure may include the following beneficial effects. When the transmission of the data frame is switched from the first link to the second link, the retransmission counting of the data frame is performed on the second link, so as to realize counting of data frame retransmission when switching of data frame transmission occurs.

It should be further understood that in the present disclosure, "multiple" refers to two or more, and other quantifiers are similar. "And/or", which describes the association relationship of the associated objects, means that there can be three kinds of relationships, for example, A and/or B, which can mean that A exists alone, A and B exist at the same time, and B exists alone. The character "/" generally indicates that the associated objects are an "or" relationship. The singular forms "a," "the," and "said" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the present disclosure.

It is further to be understood that although the operations in the embodiments of the present disclosure are described in a specific order in the drawings, it should not be construed as requiring that the operations are performed in the specific order shown or in the serial order, or requiring that all operations shown are performed to obtain the desired result. In certain circumstances, multitasking and parallel processing may be advantageous.

Other embodiments of the present disclosure will readily occur to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for data frame transmission, comprising:

determining, by a multilink device in a wireless fidelity (Wi-Fi) system, that transmission of a data frame is switched from a first link to a second link; and in response to determining that the transmission of the data frame is switched from the first link to the second link, performing, by the multilink device in the Wi-Fi system, retransmission counting of the data frame on the second link;

wherein performing the retransmission counting of the data frame on the second link comprises:

determining a retransmission count value of the data frame corresponding to the first link, wherein the retransmission count value indicates a number of times the data frame has been retransmitted;

performing the retransmission counting of the data frame on the second link by taking the retransmission count value of the data frame corresponding to the first link as an initial value of a retransmission count value of the data frame corresponding to the second link; and continuing to use a transmission identifier and a sequence number of the data frame corresponding to the first link as a transmission identifier and a sequence number of the data frame corresponding to the second link.

2. The method according to claim 1, wherein performing the retransmission counting of the data frame comprises:

initializing a contention window, and increasing the retransmission count value of the data frame corresponding to the second link in response to retransmission of the data frame until the contention window reaches the maximum value.

3. The method according to claim 2, further comprising:

in response to successful transmission of the data frame, initializing the retransmission count value to zero.

4. An apparatus for data frame transmission, applied to a multilink device in a wireless fidelity (Wi-Fi) system, comprising:

a processor; and a memory, configured to store instructions executable by the processor, wherein the processor is configured to:

determine that transmission of a data frame is switched from a first link to a second link; and in response to determining that the transmission of the data frame is switched from the first link to the second link, perform retransmission counting of the data frame on the second link;

wherein when performing retransmission counting of the data frame on the second link, the processor is configured to:

determine a retransmission count value of the data frame corresponding to the first link, wherein the retransmission count value indicates a number of times the data frame has been retransmitted;

perform the retransmission counting of the data frame on the second link by taking the retransmission count value of the data frame corresponding to the first link as an initial value of a retransmission count value of the data frame corresponding to the second link; and continue to use a transmission identifier and a sequence number of the data frame corresponding to the first link as a transmission identifier and a sequence number of the data frame corresponding to the second link.

5. The apparatus according to claim 4, wherein the processor is configured to:

initialize a contention window, and increase the retransmission count value of the data frame corresponding to the second link in response to retransmission of the data frame until the contention window reaches the maximum value.

6. The apparatus according to claim 5, wherein the processor is configured to:

in response to successful transmission of the data frame, initialize the retransmission count value to zero.

7. A non-transitory computer readable storage medium, wherein when instructions in the storage medium are executed by a processor, the processor is enabled to cause a multilink device in a wireless fidelity (Wi-Fi) system implement a method comprising:

determining that transmission of a data frame is switched from a first link to a second link; and in response to determining that the transmission of the data frame is switched from the first link to the second link, performing retransmission counting of the data frame on the second link;

wherein performing the retransmission counting of the data frame on the second link comprises:

determining a retransmission count value of the data frame corresponding to the first link, wherein the retransmission count value indicates a number of times the data frame has been retransmitted;

performing the retransmission counting of the data frame on the second link by taking the retransmission count value of the data frame corresponding to the first link as an initial value of a retransmission count value of the data frame corresponding to the second link; and continuing to use a transmission identifier and a sequence number of the data frame corresponding to the first link as a transmission identifier and a sequence number of the data frame corresponding to the second link.

8. The non-transitory computer-readable storage medium according to claim 7, wherein performing the retransmission counting of the data frame comprises: initializing a contention window, and increasing the retransmission count value of the data frame corresponding to the second link in response to retransmission of the data frame until the contention window reaches the maximum value.

9. The non-transitory computer-readable storage medium according to claim 8, wherein the processor is further enabled to implement:

in response to successful transmission of the data frame, initializing the retransmission count value of the data frame corresponding to the second link to zero.

* * * * *